United States Patent [19]

Gilbreath et al.

[11] 3,868,546
[45] Feb. 25, 1975

[54] LIGHT DIMMING SYSTEM FOR CONTROLLING BRIGHTNESS AND RATE OF CHANGE OF BRIGHTNESS OF LIGHTS

[75] Inventors: Benjamin F. Gilbreath, Richardson; Hou Leh Yeh, Euless, both of Tex.

[73] Assignee: Hunt Electronics Company, Dallas, Tex.

[22] Filed: Mar. 26, 1973

[21] Appl. No.: 344,491

[52] U.S. Cl............. 315/293, 315/227 R, 315/291, 315/299, 315/361
[51] Int. Cl..................... H05b 37/02, H05b 39/04
[58] Field of Search........... 315/194, 228, 291, 292, 315/293, 294, 295, 297, 299, 301, 307, 316, 227 R, 361; 330/29

[56] References Cited
UNITED STATES PATENTS

| | | | |
|---|---|---|---|
| 3,534,224 | 10/1970 | Skirpan et al.................. | 315/291 X |
| 3,706,913 | 12/1972 | Malatchi........................... | 315/292 |
| 3,731,215 | 5/1973 | Peil et al............................. | 330/29 |

Primary Examiner—John Kominski
Assistant Examiner—E. R. La Roche
Attorney, Agent, or Firm—Clegg, Cantrell & Crisman

[57] ABSTRACT

One or more separate control units are provided for controlling the operation of a common lamp dimmer unit which, in turn, controls the lighting of a lamp or lamps. Such remote control unit is capable of controlling the brightness of the lamps and the rate at which the brightness is changed. A plurality of control units may be connected in parallel with one another to the lamp dimmer unit to individually and independently control the operation of the dimmer unit.

13 Claims, 1 Drawing Figure

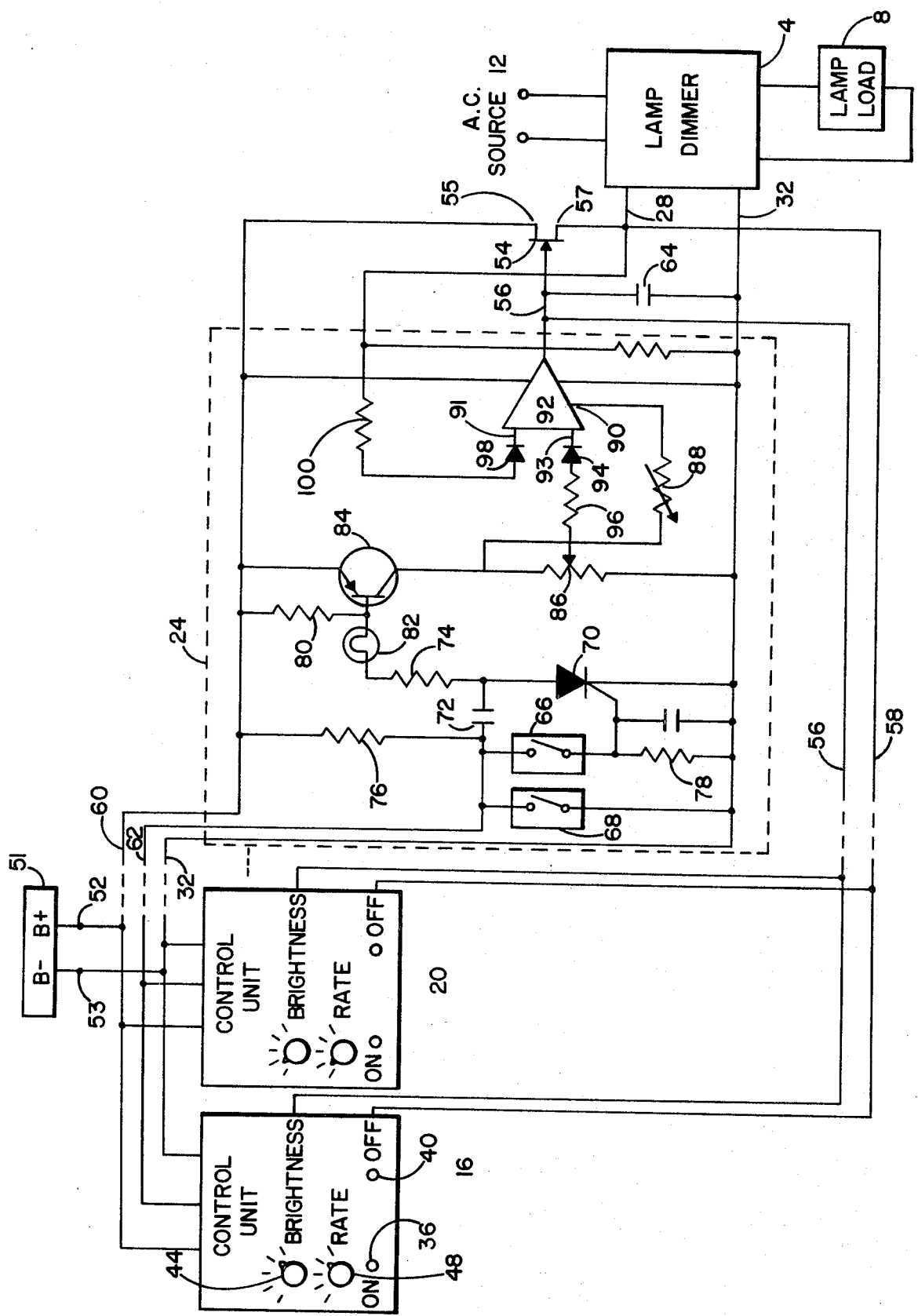

LIGHT DIMMING SYSTEM FOR CONTROLLING BRIGHTNESS AND RATE OF CHANGE OF BRIGHTNESS OF LIGHTS

BACKGROUND OF THE INVENTION

This invention relates to light dimming systems and to control units for such systems capable of controlling the brightness and the rate of change of brightness of a lamp or lamps connected to the system.

Conventional systems for controlling the rate of change of brightness of lights (i.e., the rate at which the brightness level is increased or decreased) typically include either a manually operated potentiometer or a motor-driven potentiometer. With a light dimming system utilizing a manually operated potentiometer, it is difficult to obtain smooth and even transitions between brightness levels because of the dependency upon the steadiness of the human operator. Light dimming systems utilizing motor-driven potentiometers overcome this problem, but such systems are relatively bulky and costly. Further, such systems are subject to fairly rapid wear because of the frequent mechanical movement.

It is an object of the present invention to provide a compact and inexpensive light dimming system for controlling the brightness level of lights and the rate of changing the brightness level.

It is another object of the present invention to provide such a system having a relatively long and useful life.

It is still another object of the present invention to provide a control unit for a light dimming system which is adapted to control change of brightness level of light automatically and without requiring the use of a motor.

The need for light dimming systems having multiple control units has been discussed in J. C. Johnson, U.S. Pat. No. 3,697,821, issued Oct. 10, 1972. A system is there disclosed which includes a plurality of separate remote control units for individually and independently controlling the operation of a common lamp dimmer unit, each remote control unit being capable of turning off and turning on the lamp dimmer unit and of controlling the brightness of the lamps independently of the previous setting or condition of any of the other remote control units. In this system, the brightness level is controllable but not the rate of changing the brightness level (other than manually).

It is a further object of the present invention to provide a new and improved control unit for a light dimming system which may be connected in parallel with one or more other such control units to individually and independently control both the brightness and the rate of change of brightness of lights.

BRIEF DESCRIPTION OF THE DRAWINGS

The above and other objects and advantages of the present invention will become more apparent from the following detailed description presented in connection with the accompanying drawing which shows a light dimming system having a plurality of control units in accordance with the present invention.

DETAILED DESCRIPTION

The system shown in the drawing includes a master lamp dimmer unit 4 for controlling the brightness level of a lamp or lamps included in a lamp load 8. The lamp dimmer 4 controls the root-mean-square (R.M.S.) value of current flow from an A.C. source 12 to the lamp load 8. An illustrative lamp dimmer is disclosed in co-pending application, Ser. No. 168,317, filed August 2, 1971, now U.S. Pat. No. 3,733,528 granted May 15, 1973.

The lamp dimmer 4 functions in response to voltage signals from a field effect transistor 54 which is coupled to the lamp dimmer by conductor 28. A common conductor 32 couples the lamp dimmer 4 with a plurality of separate remote control units 16, 20, . . . , and 24 which are coupled in parallel with one another by conductors 32, 56, 60 and 62. A direct current voltage source 51 provides direct current operating voltage via a positive terminal 52 connected to conductor 60 and via a negative terminal 53 connected to common conductor 32, for energizing the control units 16, 20, . . . , and 24. Although only three control units are shown, more or less could be provided as desired by the system user. Each of the control units is identical in construction and includes two control knobs, an "on" button and an "off" button. For example, control unit 16 includes a spring loaded pushbutton switch 36 for "turning on" the control unit 16, a spring loaded pushbutton switch 40 for turning off the control unit 16 and also the other control units, a rotatable control knob 44 for setting the brightness or intensity level of the lamp load 8, and a rotatable control knob 48 for setting the rate at which the brightness for the lamp load 8 is to be changed from one level to another, i.e., either to a level greater or less than the previous level. Each of the control units may be used independently to control the brightness and rate of change of brightness of the lamp load 8 regardless of the previous settings of any of the other control units.

A capacitor 64 interconnects conductors 56 and 32 for storing a charge and for thereby supplying a voltage to the gate electrode of the field effect transistor 54 for controlling the voltage at the source electrode 57 of the field effect transistor and thus the voltage supplied via the conductor 28 to the lamp dimmer 4. The lamp dimmer 4, in response to the voltage on conductor 28, controls the brightness of the lamp load 8. The voltage across the capacitor 64 is determined by the control units 16, 20, . . . , and 24 as will be more particularly described later.

The operation of control unit 24 will now be described, it being understood that the other control units 16, 20, . . . , operate in the same fashion. The control unit 24 includes a spring-loaded normally open switch 66 for turning on the control unit 24 and a similar spring-loaded normally open switch 68 for turning off or disabling the control unit 24 and any other control unit which may not have been turned off. The switch 66 is connected to the gate electrode of a unilateral semiconductor triode switch 70 of the type known as a silicon-controlled rectifier (SCR). The cathode of the SCR 70 is connected to the common conductor 32 interconnecting all the control units to the lamp dimmer 4. The anode of the SCR 70 is connected to the junction interconnecting a capacitor 72 and a resistor 74. When the switch 66 is momentarily closed in response to the depression of a corresponding "on" pushbutton of the control unit 24, current flows from the direct current source 51 via a resistor 76, the switch 66 and a resistor 78 to the conductor 32. Current is also supplied to the gate electrode of the SCR 70 and this turns on or renders conductive the SCR.

When the SCR 70 is conductive, its internal anode-to-cathode impedance is very small. When turned on, the SCR 70 remains conductive until the voltage between its anode and cathode is reduced to practically zero or is reversed in polarity. With the SCR 70 conductive and the switch 66 opened following its momentary closure, the commutating capacitor 72 charges up to a direct current voltage level corresponding to the direct current voltage difference between the junction of resistor 76 and switch 66 (which is B+) and the junction between resistor 74 and the SCR 70 (which is near B−, i.e., near the potential of conductor 32.)

Turning on the SCR 70 causes direct current to flow from the terminal 52 via a resistor 80, an indicator lamp 82, (which is energized to provide a visual indication that the control unit is on) the resistor 74, and the SCR 70 to the conductor 32. A voltage drop is thus developed across the resistor 80 causing a PNP-type transistor 84 to be biased into saturation so that current also flows via the transistor 84 through the resistor of a potentiometer 86 to the conductor 32. The flow of current through the resistor of the potentiometer 86 establishes a voltage at the tap of the potentiometer and it is this voltage which ultimately determines the brightness level of the lamp load 8. The tap of the potentiometer 86 is mechanically coupled to a corresponding control knob for setting the brightness level in accordance with the operation to be described hereafter.

Turning on the transistor 84 also causes current to flow from the collector of the transistor through a variable resistor 88 to the control terminal 90 of an operational transconductance amplifier (OTA) 92. the adjustable element of the variable resistor 88 is mechanically coupled to a corresponding control knob for controlling the rate of changing the brightness level of the lamp load 8 as will be described hereafter.

The OTA 92 is similar to a conventional operational amplifier in that it includes the usual two differential input terminals 91 and 93, but also differs therefrom in that it includes a control terminal 90. One of the differential input terminals 93 of the OTA 92 is connected via a diode 94 and a resistor 96 to the tap of the potentiometer 86. The other differential input terminal 91 is connected via a diode 98 and a resistor 100 to the source electrode 57 of the field effect transistor 54. The output terminal of the OTA 92 is connected to the capacitor 64 and to the gate electrode of the field effect transistor 54.

The OTA 92 operates to generate an output current which is proportional to the transconductance of the OTA and the voltage difference at the OTA's two differential input terminals. The transconductance of the OTA 92, in turn, is determined by the current supplied to the control terminal 90. The voltage difference at the two differential input terminals of the OTA 92 also determines the polarity of the output current of the OTA. When the voltages at the two differential input terminals 91 and 93 are equal, then the output current is zero. The OTA 92 might illustratively comprise one of the OTA's described in RCA publication "RCA Solid State Data Book Series," Application Notes, SSD-202, 1972, pages 223 et seq.

The output current from OTA 92 either charges or discharges the capacitor 64, depending upon the polarity of the current. The rate of charging and discharging the capacitor 64 can thus be controlled by controlling the application of current to the control terminal 90, which, in turn, is controlled by the setting of the variable resistor 88. As long as there is a voltage difference at the input terminals 91 and 93 of the OTA 92 and current is being supplied to control terminal 90, the capacitor 64 will continue to charge or discharge, depending on the polarity of the output current of the OTA. If the polarity is positive, the capacitor 64 will continue to charge, causing the voltage thereacross to increase and the voltage at the source electrode 57 and thus at the differential input terminal 91 to increase until the voltage at terminal 91 is equal to the voltage at differential input terminal 93. The voltage at terminal 93 is, of course, established by the setting of the tap of the potentiometer 86. If the polarity of the output current of the OTA 92 is negative, then the converse operation occurs. Thus the setting of the tap of the potentiometer 86 determines the voltage across the capacitor 64 and the setting of the variable resistor 88 determines the rate of change of the voltage across the capacitor. As already indicated, the voltage across the capacitor 64 controls the voltage at the source electrode 57 of the field effect transistor 54 to thereby control the voltage supplied to the lamp dimmer 4.

The employment of the OTA 92 in the configuration of the drawing provides an advantage over other types of circuitry because of its ability to generate currents of low magnitude. Because of this, the charge or discharge time of the capacitor 64 can be made longer than would otherwise be possible so that the elapsed time of changing the brightness of the lamp load 8 can similarly be made longer. This is desirable in lamp dimming systems.

The field effect transistor 54 is provided for purposes of isolation. Some current is required for the differential input 91 of the OTA 92 and if this input were coupled directly to the capacitor 64, it would adversely affect the rate of charge or discharge of the capacitor. Because the gate electrode of a field effect transistor does not draw current by coupling the gate electrode to the capacitor 64, no charge is drained from the capacitor 64 by the differential input 91 in the course of charging and discharging the capacitor. The current needed by the differential input 91 is obtained via conductor 60 from the terminal 52 of the voltage source 51.

The control unit 24 is turned off, i.e., disabled from affecting the voltage across the capacitor 64 by momentarily closing an "off" switch 68. Prior to closing the switch 68, when the control unit 24 is on so that the SCR 70 is conducting, the left-hand plate of the capacitor 72 is at a potential of B+ and the right-hand plate is at near B− potential of conductor 32. When the switch 68 is closed, the potential of the left-hand plate of the capacitor 72 is brought to near B− potential causing the right-hand plate to be momentarily brought to a negative potential below the potential of the left-hand plate. The voltage at the cathode of the SCR 70 is thus momentarily made more positive than the voltage at the anode thereof thereby disabling or rendering the SCR 70 non-conductive. With the SCR 70 non-conductive, no current flows via the resistor 80 so that the transistor 84 is turned off. This, in turn, results in the termination of current flow via the variable resistor 88 to the control terminal 90 of the OTA 92 so that the OTA is effectively turned off. The control unit 24 is thereby disabled or turned off until the "on" switch 66 is again closed.

Note that the "off" switch 68 is connected via the conductor 62 to the other control units and specifically to the commutating capacitors of those units corresponding to the capacitor 72 of control unit 24. Thus, if one of the control units were turned on and switch 68 were momentarily closed, the other control units would be turned off or disabled in the same manner as described for control unit 24.

Momentarily closing the "on" switch of a control unit also causes disablement of all other control units in the same manner as described for closure of an "off" switch. However, unlike closure of an "off" switch, the closure of an "on" switch enables or turns on the control unit in which the "on" switch is located.

The operation of the system of the drawing will now be briefly summarized. Assume that the voltage across the capacitor 64 is at a certain level determined by a previous setting of one of the control units 16, 20, . . . , so that a certain brightness level for the lamp load 8 has been established and also assume it is desired that the brightness of the lamp load be increased to a higher level. To do this, the system user would set the brightness control knob of the control unit 24 to the position corresponding to the desired brightness level and this would correspondingly position the tap of the potentiometer 86 at the desired position. The system user would also set the rate control knob of the control unit 24 to a position indicating the desired rate of increase of the brightness level—which would establish a corresponding setting of the variable resistor 88. The "on" pushbutton would then be depressed resulting in a momentary closure of the "on" switch 66. The SCR 70 would thereby be enabled causing the lamp 82 to turn on, indicating the control unit had been turned on, and the transistor 84 to become saturated. Current would thus flow through the potentiometer 86 establishing a voltage level at the tap of the potentiometer, and through the variable resistor 88 to the control terminal 90 of the OTA 92. Since it was assumed that the setting of the brightness control knob and the tap of the potentiometer 86 was to increase the brightness level of the lamp load 8, the voltage at the tap 86 would be greater than the voltage across the capacitor 64 were increased, the voltage at the source electrode 57 would correspondingly increase causing the lamp dimmer 4 to increase the brightness level of the lamp load 8. In this manner, the brightness of the lamp load is increased to a predetermined level at a predetermined rate.

To reduce the brightness level of the lamp load 8, a similar but converse operation would take place in which the voltage across the capacitor 64 would be decreased, again at a rate determined by the setting of the variable resistor 88.

In the manner shown and described above, a plurality of control units can be connected to a lamp dimmer for controlling both the brightness of the lamp load and also the rate of change of brightness from one level to another level. Each of such control units is capable of changing the brightness level of the lamp load and of determining the rate of such change regardless of the previous setting or condition of any of the other control units. This is done by setting the "brightness" and "rate" control knobs of the control unit, and then depressing the "on" pushbutton of the control unit. Of course, the "on" pushbutton could be depressed before setting the control knobs, with the "rate" control knob then being set, followed by the setting of the "brightness" knob. Subsequent changes in the brightness level could be effected in the same manner. To turn off all control units the "off" pushbutton of any control unit is depressed.

It is to be understood that the above-described arrangement is only illustrative of the principles of the present invention. Other arrangements may be described by those skilled in the art without departing from the spirit and scope of the invention and it is intended that the appended claims cover such arrangements.

What is claimed is:

1. A light dimming system including
a dimmer unit responsive to a voltage signal for controlling the flow of current through a lamp load,
a capacitor coupled to said dimmer circuit for storing a charge to thereby develop thereacross said voltage signal, and
at least one control unit coupled to said capacitor for selectively charging and discharging said capacitor, said control unit comprising
an operational transconductance amplifier for supplying current to and receiving current from said capacitor to thereby respectively charge and discharge the capacitor, said amplifier having first and second differential input terminals and a control terminal,
first adjustable means for controlling voltage applied to said second differential input terminal, and
second adjustable means for controlling current applied to said control terminal to thereby control the current supplied to or received from said capacitor by said amplifier.

2. A light dimming system as in claim 1 wherein said first differential input terminal is coupled to said capacitor.

3. A light dimming system as in claim 2 wherein said first adjustable means comprises a potentiometer whose tap is connected to said second differential input terminal and wherein said second adjustable means includes a variable resistor.

4. a light dimming system as in claim 2 further including a power supply means for energizing said control unit and wherein said control unit further comprises a switching device having a pair of power electrodes connected in series with said power supply means and having a control electrode, first manually operable means coupled to the control electrode of said switching device for activating said switching device, and means responsive to the activation of said switching device for supplying current to said first adjustable means to thereby enable said first adjustable means to supply the voltage to said second differential input terminal.

5. A light dimming system as in claim 4 wherein said control unit further comprises second manually operable switch means coupled between the power electrodes of said switching device for disabling said switching device.

6. A light dimming system as in claim 4 wherein said control unit further includes a visual indicating means responsive to the activation of said switching device for generating a visual indication.

7. A light dimming system as in claim 1 further including a field effect transistor whose gate electrode is connected to said capacitor, whose source electrode is connected to said first differential input terminal and to said dimmer circuit, and a power supply means connected to its drain electrode.

8. a light dimming system including
a dimmer circuit responsive to a voltage signal for controlling the flow of current through a lamp load, circuit means connected to said dimmer circuit for producing said voltage signal, and
a plurality of control units coupled to the dimmer circuit and each including an operational transconductance amplifier for supplying current to said circuit means to enable said circuit means to produce said voltage signal, said amplifier having first and second differential input terminals and a control terminal, each of said control units further including a first adjustable means for varying voltage applied to said second differential input terminal and second adjustable means for varying current applied to said control terminal.

9. A light dimming system as in claim 8 wherein said circuit means includes a capacitor connected to the output of said amplifier, and a field effect transistor whose gate electrode is connected to said capacitor, whose source electrode is connected to said first differential input terminal and to said dimmer circuit to supply thereto a voltage signal whose value is proportional to a charge stored on said capacitor.

10. A control unit for controlling the brightness and rate of change of brightness of a lamp load connected to an A.C. source through a light dimming circuit of the type controlled by a D.C. voltage level, which comprises:
first and second terminals for connecting to a D.C. source;
a controlled switching device;
means for connecting said controlled switching device across said source-connecting terminals;
means for connecting the dimmer circuit to said second source-connecting terminal;
means for triggering said controlled switching device;
an adjustable potentiometer;
means responsive to the triggering of said controlled switching device for impressing a voltage across said potentiometer;
an operational transconductance amplifier having first and second differential input terminals, a control terminal, and an output terminal, said amplifier producing a current on said output terminal determined by the difference in voltage at said first and second differential input terminals and by the current at said control terminal;
means for connecting the output terminal of said amplifier to the light dimming circuit for establishing the control D.C. voltage level;
means connecting the tap on said potentiometer to said second differential input terminal of said amplifier to establish a voltage at said second differential input terminal;
means coupling said output terminal of said amplifier to said first differential input terminal of said amplifier to establish a voltage at said first differential input terminal to increase or decrease the D.C. control voltage level until said voltage established at said first differential input terminal is substantially equal to the voltage established at said second differential input terminal;
a variable resistance connected to said control terminal; and
means for impressing a current through said variable resistance when a voltage is impressed across said potentiometer to control the rate at which said D.C. voltage level increases or decreases.

11. A control unit as set forth in claim 10 and including:
a first manually operable switch means in series with said source-connecting terminals for energizing said triggering means to activate said controlled switching device;
a commutating capacitor connected between said first manually operable switch means and one side of said controlled switching device; and
a second manually operable switch means for connecting said commutating capacitor across said controlled switching device for disabling said switching device when said second manually operable switch means is operated.

12. A control unit as set forth in claim 10 wherein said means for impressing said voltage across said potentiometer includes:
a switching transistor having its emittercollector junction connected in series with said potentiometer and said source-connecting terminals; and
means coupling the base of said transistor to said controlled switching device for rendering said transistor conductive when said switching device is triggered.

13. A control unit as set forth in claim 12 wherein said means coupling said base of said transistor includes visual indicator means actuable in response to the triggering of said controlled switching device.

* * * * *